United States Patent
Agarwal et al.

(10) Patent No.: US 7,707,080 B2
(45) Date of Patent: Apr. 27, 2010

(54) RESOURCE USAGE METERING OF NETWORK SERVICES

(75) Inventors: Vikas Agarwal, New Delhi (IN);
Neeran M Karnik, New Delhi (IN);
Arun Kumar, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1271 days.

(21) Appl. No.: 10/729,803

(22) Filed: Dec. 5, 2003

(65) Prior Publication Data

US 2005/0125314 A1 Jun. 9, 2005

(51) Int. Cl.
*G06F 15/02* (2006.01)
*G07F 19/00* (2006.01)
(52) U.S. Cl. .............................. 705/32; 705/30; 705/34
(58) Field of Classification Search ........................ None
See application file for complete search history.

(56) References Cited

U.S. PATENT DOCUMENTS

| 7,020,628 | B2 * | 3/2006 | Peterson et al. ............. 705/32 |
| 2002/0083003 | A1 * | 6/2002 | Halliday et al. ............. 705/52 |
| 2003/0056200 | A1 * | 3/2003 | Li et al. ..................... 717/128 |
| 2004/0210496 | A1 * | 10/2004 | Deliwala et al. ............. 705/30 |
| 2005/0044228 | A1 * | 2/2005 | Birkestrand et al. ......... 709/226 |

* cited by examiner

*Primary Examiner*—F. Ryan Zeender
*Assistant Examiner*—Fahd A Obeid
(74) *Attorney, Agent, or Firm*—Gibb I.P. Law Firm, LLC

(57) ABSTRACT

Process accounting information is recorded, together with service request logs written by e-service applications. These two sets of information are aggregated and correlated, to generate usage metrics relating to resource usage for individual service requests. Such per-request information can be used as a basis for charging users making such requests. Services requests often simultaneously consume computing resources, in which case resource usage is proportionally divided between such simultaneous service requests.

15 Claims, 6 Drawing Sheets

RESOURCE USAGE METERING OF NETWORK SERVICES

FIELD OF THE INVENTION

The present invention relates to resource usage metering of network services.

BACKGROUND

Network-accessible software services (referred to as "e-services" or "network services") are increasingly used to deliver software functionality, and to provide software interfaces to remote resources. Examples of such services include web services and grid services.

Requests for e-services arriving from different client systems may be served at the same time. In a typical scenario, a client application makes requests for a service. While fulfilling such requests, the service consumes resources in its local environment. These resources may be distributed across the service provider's infrastructure. While consumption of these system resources by the services may be monitored as a matter of course, the usage of resources by individual users of those services is not monitored.

Existing systems, such as mainframes and UNIX servers, perform limited resource usage metering and accounting for processes. Resource usage metering is currently performed on a "per-process" basis. Since the same process (implementing a service) typically serves multiple clients, such information is not able to be used as a basis to charge clients for their use. Web services platforms, such as the WebSphere™ platform produced by the International Business Machines Corporation, maintain logs of service requests.

A need exists in view of these and other observations for an improved manner of actively monitoring the consumption of resources for each request across a distributed environment.

SUMMARY

Techniques are described herein for correlating "per-process" accounting information and request logs written by e-service applications, and aggregating the resulting usage metrics to generate "per-request" resource usage information. Such per-request information can be used as a basis for charging users making service requests. Metering of resource usage in networked software applications is also important for a variety of other reasons. Resource usage data can also be used for capacity planning, enforcing usage quotas, and so on.

Initially, process accounting information is recorded concerning resource usage of computing resources. A record is also maintained of service usage requests to which the process accounting information relates. These two sets of information are correlated to generate an account of resource usage for each request.

DETAILED DESCRIPTION

Figure 1:
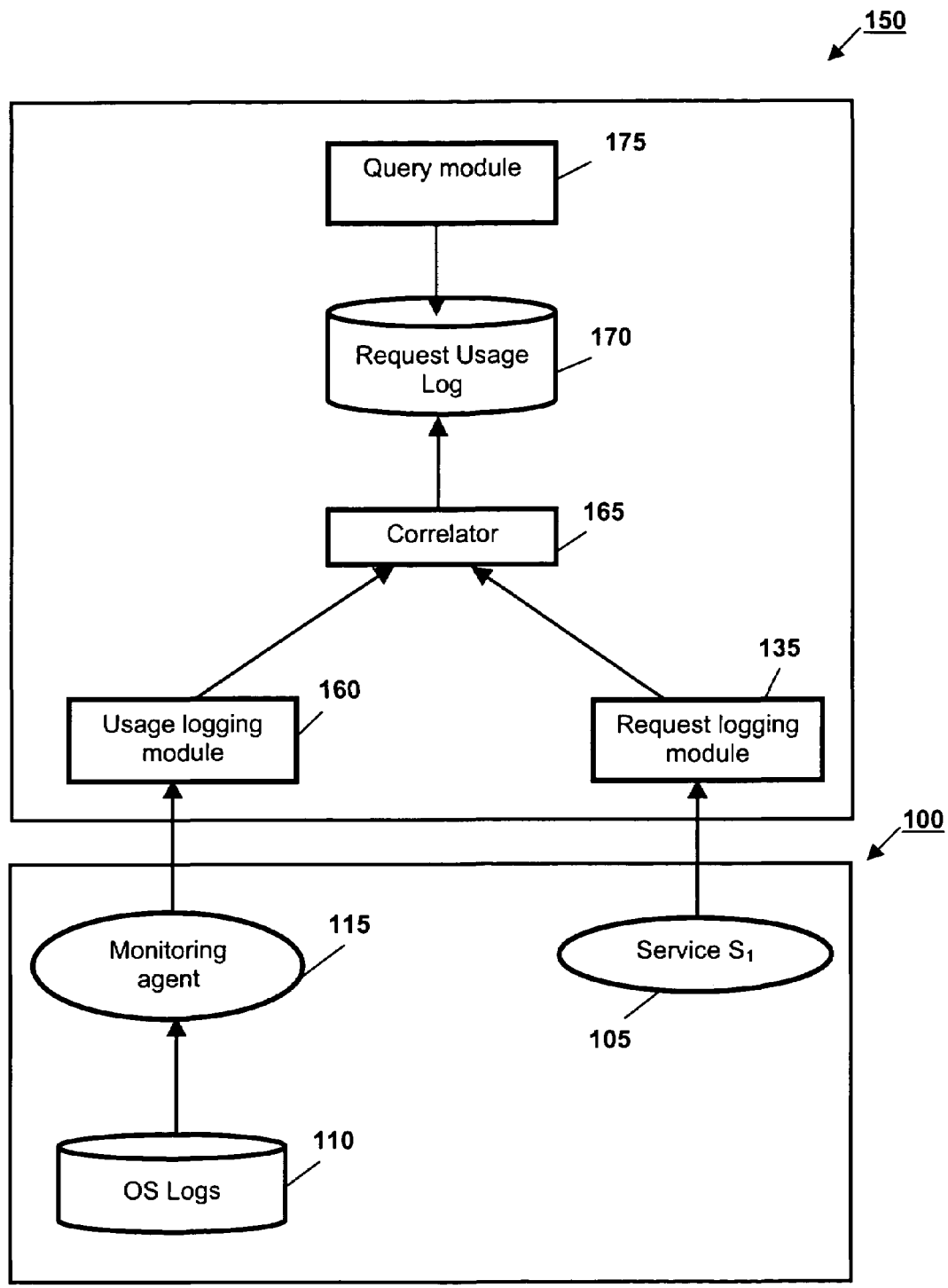
FIG. 1 is a schematic representation of an architecture used for resource usage metering for a monolithic service.

FIG. 1 schematically represents a monolithic service 105 ($S_1$) implemented as a process running on a node 100. Once initialized, the service 105 executes indefinitely, serving client requests as and when such requests arrive. The service 105 may be idle while not servicing requests. Existing operating system accounting mechanisms account for resource use on a per-process basis, as described above. A monitoring agent 115 can be operated on each node. The monitoring agent 115 is tasked with reading such operating system logs 110 and reporting the relevant metrics to a Resource Usage Service (RUS) 150.

The start and end of a request are identifiable events in an e-services platform. The client should only be charged for the resource usage of the service 105 in the time interval between these events. A request logging module 135 in the RUS 150 stores relevant information from the "request_start" and "request_end" events. This information might include, as an example, a service identification number, the client's user identification number, perhaps a project/account identification number to be charged, and the time at which these start and end events occurred.

Using the request timing information from request logging module 135, and the resource usage reported by usage logging module 160, a correlator 165 in the RUS 150 can determine the resource consumption of various requests during different time windows. Details of this correlation process are described below. This "per-request" metering information is stored internally in a request usage log 170.

The query module 175 responds to various types of queries for accounting information. For this purpose the query module 175 uses the request usage log 170, and aggregates the per-request usage data to compute "per-user", "per-node", or "per-service" statistics, as requested or as required.

Correlation of Resource Usage Information

The correlator 165 in the RUS 150 receives logged information from two sources—the monitoring agents 115, and the service 105.

Figure 2:
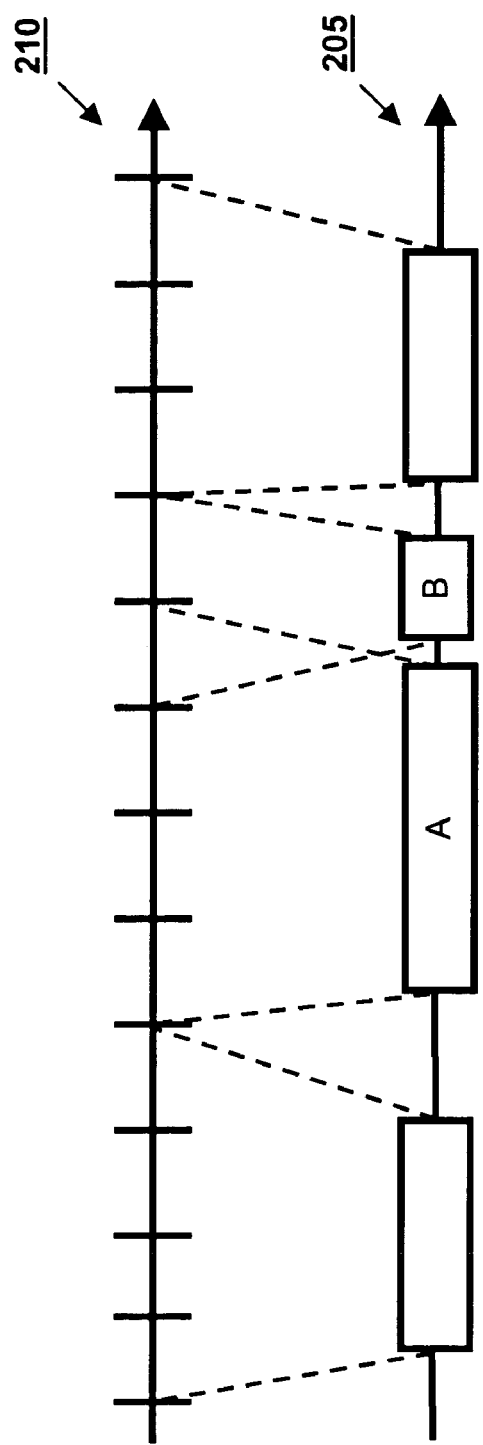
FIG. 2 is a schematic representation of two timelines used for assigning resource usage to requests in the case of two requests A and B.

FIG. 2 represents two timelines, namely a request logging timeline 205 and usage logging timeline 210. Requests A and B are shown on the request logging timeline 205, and dashed lines define the window of the usage logging timeline 210 during which these requests are serviced. The task of the correlator 165 is to determine this window by correlating the request and usage logging information. This correlation is performed so that the resource usage can be charged to the appropriate requests—and therefore—to the corresponding users.

The request logging timeline 205 is continuous (since requests can arrive and depart at any time), whereas the usage logging timeline 210 is typically discrete (because a monitoring agent reports usage periodically). Therefore, one may not be able to accurately assign resource consumption to specific requests. As an example, in FIG. 2, the usage logging "windows" for requests A and B overlap, although the requests themselves do not overlap.

The correlator 165 can use a predetermined heuristic procedure to allocate the "overlapping" usage of resources between the two requests A and B. As an example, usage may be evenly split between requests A and B. Alternatively, usage may be split in a weighted manner, based upon the respective durations of requests A and B in that window for the two competing requests. Any other predetermined heuristic can be used, though generally the allocation is intended to reflect the relative drain upon resources caused by overlapping requests.

Multiple users may of course attempt to access a service at the same time. There are two possibilities for dealing with such an occurrence. First, the service queues up the requests, and serves the requests one at a time. Second, the service is multi-threaded, and serves the requests concurrently.

The first case of sequential servicing provides a service that can send a start event to the request logging module 135 when service 105 dequeues (that is, "picks up") a request for processing, and an end event when the service 105 has computed and sent back the response, if any. This ensures that the requests do not overlap on the request logging timeline 205. This corresponds to the example shown in FIG. 2 with requests A and B. As described earlier, the correlator 165 can unambiguously assign the reported resource usage over a request's time window to that request's calling user.

The second case of multi-threaded servicing, however, provides multiple threads within the same process, which may service requests from different clients. Thus, requests being serviced concurrently overlap on both timelines. If the operating system is capable of providing thread-level accounting information, the monitoring agent 115 merely reports "per-thread" information. The second case then reduces to the first case described above. More likely, though, is the situation in which only process-level accounting is available. Consequently, the RUS 150 deals with the overlapping windows. The RUS 150 can assign the reported resource usage to the active requests during a time window using the algorithm given in Table 1 below. Again, this assignment can be performed either uniformly, or in a weighted manner, based upon the length of each request's time window. Further alternatives are also possible, as noted above.

Figure 3:
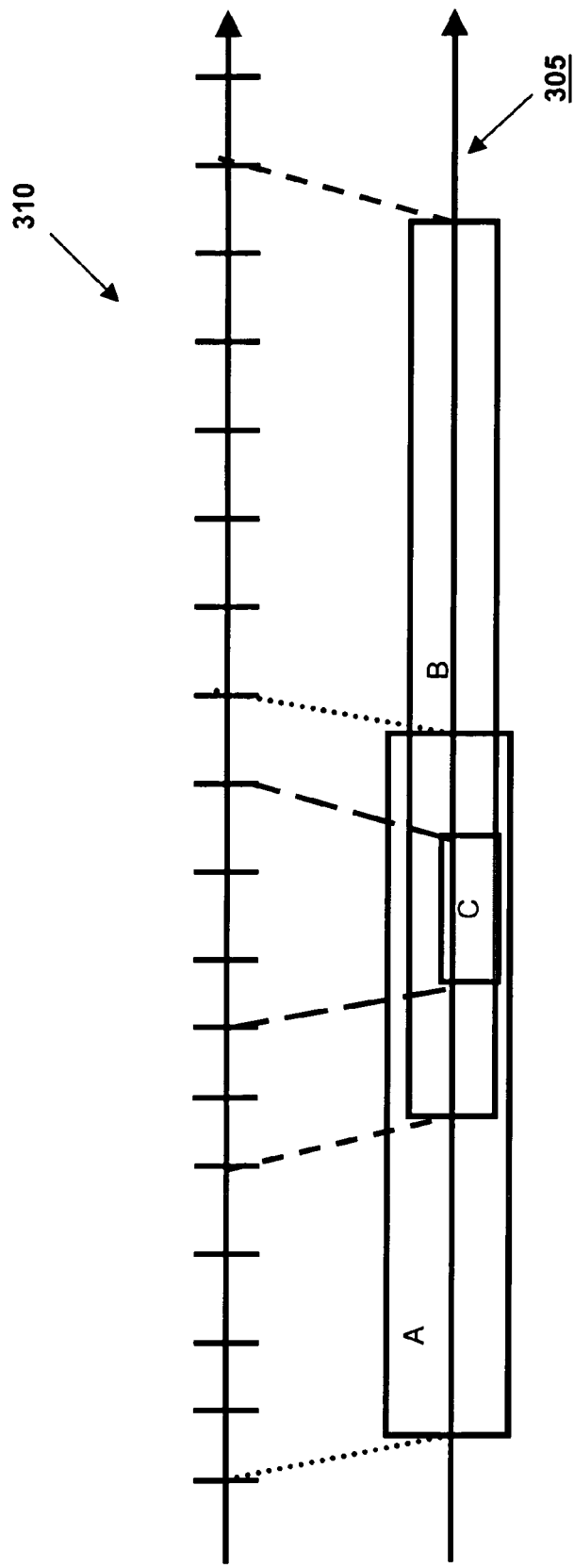
FIG. 3 is a schematic representation of two timelines used for assigning resource usage to requests in the case of three overlapping requests A, B and C.

FIG. 3 presents another pair of timelines 305, 310 corresponding with timelines 205, 210 of FIG. 2. FIG. 3, however, presents a more general case of requests (A, B and C) that overlap on the request logging timeline. The correlator 165 maintains a list of active requests (requests which are still executing after the last usage log and any new requests) for each service process. For each active request, the correlator 165 maintains the request-identification number, start-time and end-time. Whenever the correlator 165 receives the usage log for a process, the correlator 165 executes the algorithm presented below in Table 1.

TABLE 1

```
t = t_e - t_s        // t_s is the start time and t_e is the end time of the usage
                     //   log window
D = 0
for all requests in active list R do
    if e_i = null    // e_i is the end-time of i-th request
        e' = t_e     // if request has not ended then set e' ...
                     // to end-time of usage log window
    else
        e' = e_i
    endif
    if s_i < t_s     // s_i is the start-time of i-th request
        s' = t_s     // if request started before this usage log ...
                     // window then set s' to start-time of usage log window
    else
        s' = s_i
    endif
    d_i = e' - s'    // duration for which i-th request was executing
                     // in the usage log window
    D = D + d_i
endfor
for all requests in R do
    W_i = d_i /D     // compute weight of i-th request
    for each usage metric in U do
        assign usage value u_i * w_i to R_i
    endfor
endfor
for all requests in R do
    if e_i < t_e     // if the request has ended in this log window
        remove R_i from R
    endif
endfor
```

The algorithm presented in Table 1 above first calculates the time interval for which the usage is reported. Then, for each active request, the algorithm calculates the duration for which that request was active in that window. Next the algorithm calculates the weight of each request and proportionately assigns the usage metrics to each request. Finally, the algorithm updates the active request list by removing those requests that have ended. The correlator 165 executes this algorithm for each service process whenever the usage log is received from its server node. The list of active requests is maintained separately for each process under consideration.

System Architecture

A service, subject of a user's service request, may have a distributed implementation within a service provider's infrastructure. That is, in servicing user requests, the service may consume resources on multiple nodes. When a service is deployed on a platform, the service spawns a set of processes onto various servers in the service provider's infrastructure. These distributed processes constitute the implementation of the service.

Figure 4:
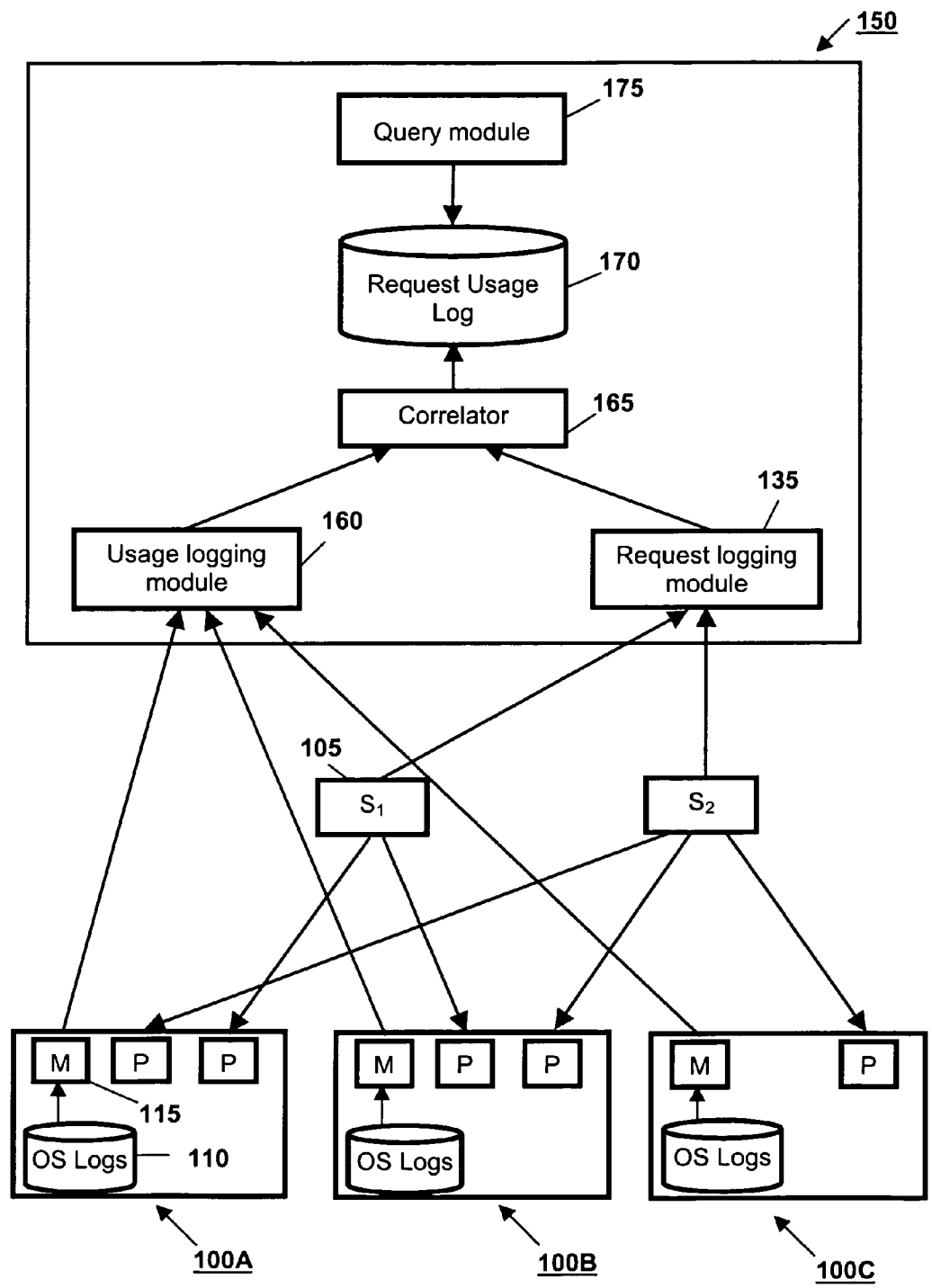
FIG. 4 is a schematic representation of an architecture used for resource usage metering for services distributed across a service provider's infrastructure.

FIG. 4 is a schematic representation of an architecture used for resource usage metering for services distributed across a service provider's infrastructure. In this example, service $S_1$ creates processes on servers 100A and 100B. Also, service $S_2$ creates processes on all three servers 100A, 100B, and 100C. Each server 100A, 100B, 100C has a monitoring agent (M) 115 that periodically sends notifications to the RUS 150 that collate resource consumption over the previous time interval (since a previous notification). Resource usage is reported for each process of interest, namely each process belonging to a service.

Since services may dynamically spawn processes, and new services may be deployed on a server at any time, the monitoring agent 115 can be configurable. The monitoring agent 115 may be configured by providing the identification numbers of the processes to be monitored, or the names of installed programs whose instances need to be monitored, as an example. A suitable manner of identifying processes can be used. The periodic usage report by the monitoring agent 115 may include machine identification number (for example, DNS name or IP address of the server), process identification number, timestamp (time at which usage has been measured), and usage metrics.

The usage metrics reported depend on what the underlying operating system makes available via the operating system log 110. These usage metrics can, as examples, include central processing unit (CPU) time, memory usage, input/output (I/O) operations, and so on. Other metrics may also be available for use, or derived from these and other examples.

A service demarcates the start and end of each request by sending notification messages to the request logging module 135. The "request_start" message contains:
- request id (guaranteed to be unique)
- user id (unique id of the client making the request)
- service id (unique id of the service being called)
- timestamp (the start-time of the request)

Similarly, the "request_end" message contains:
- request id (the same as the one reported in the start message)
- timestamp (the end-time of the request)
- [machine id, process id] tuples The [machine id, process id] tuples are used when a service dynamically spawns processes to service a request. The correlator 165 in this case receives usage reports from all processes, and cannot be preconfigured to know which processes belong to which service. Each request has its own corresponding [machine id, process id] tuples and the service must make this information available to the correlator 165.

As described above, the correlator 165 reconciles the usage reports and request start and end messages, and sends a per-request usage record to the request usage log 170 in the RUS 150. This record contains:
- request identification number
- user identification number
- service identification number
- start and end timestamps
- usage metrics Various applications that make use of this metering data can obtain the relevant information by querying the RUS 150, using a set of functions in its interface—the query module 175.

Computer Software

The software components of the system schematically described with reference to FIG. 1 are now described in further detail.

Operating System Logs

The operating system logs 110 are generated and stored by the operating system of the machine on which the service resides. The operating system logs 110 store the resource usage information for all processes.

Monitoring Agents

The monitoring agents 115 reside on the machine where the services are running. They periodically obtain the resource usage information for the desired processes from operating system logs 110. This information is sent to the usage logging module of the RUS 150. The set of desired processes for which this information has to be reported is specified by the RUS 150. On systems where interval logging (periodic logging of process accounting information by the operating system) is not supported, the monitoring agents 115 can provide the same functionality by
- using some existing system programs which provides the load information such as ps or top in UNIX.
- using information provided by the underlying operating system like /proc file system in UNIX.
- using any existing load monitoring technologies, such as the Tivoli™ load monitoring system.

e-Services

An e-service implements some software functionality or provides access to resources that can be accessed by a client. On startup, each service gets registered with the RUS 150 and informs the RUS 150 about the processes corresponding to the e-service, running on various machines. The e-service sends information to the request logging module 135 of RUS 150 corresponding to start and end of each request that is served.

Resource Usage Service

The RUS 150, or resource usage service, has the following components:

Request logging module 135 receives the request logging information from the services registered with RUS 150 and sends this information to the correlator 165.

Usage logging module 160 receives the usage logging information from the monitoring agents and sends this information to the correlator 165.

Correlator 165 receives the usage and request logging information and correlates all this information to produce per-request resource usage information using the algorithm presented in Table 1.

Request usage log 170 stores the per-request resource usage information given by the correlator 165.

Query module 175 receives queries by various clients for accounting information. For this purpose, the query module 175 uses the request usage log database and aggregates the per-request usage data to compute "per-user", "per-node", or "per-service" statistics, as requested or as required. For the purpose of aggregation relational database tools may be used.

All the components of RUS 150 can reside on the same machine. Different implementations may, however, choose to implement different components of RUS 150 on different machines communicating using any protocol.

The request logging module 135, usage logging module 160 and query module 175 of RUS 150 may implement some standard service invocation interface such as may be provided for web services, grid services, and so on. Other components such as monitoring agents 115 can thus communicate with the RUS 150. Alternatively, these components may interact using standard network protocols such as the suite of transmission control protocols/internet protocols (TCP/IP).

Procedural Overview

Figure 5:
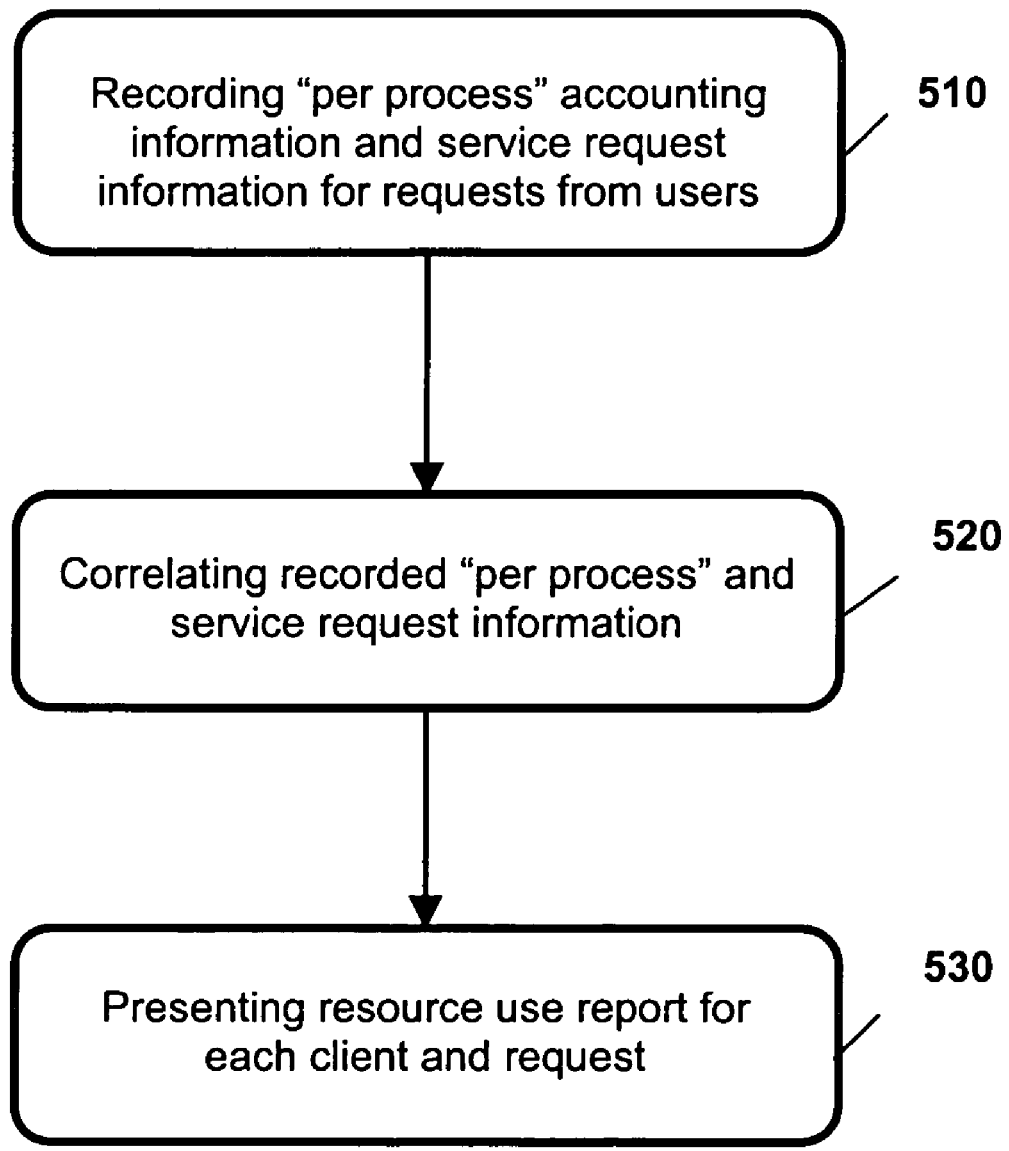
FIG. 5 is a flow chart of steps involved in performing the techniques described herein.

FIG. 5 is a flow chart that summarises, in overview, steps involved in metering resource usage as described herein. Information relating to the "per process" details of resource usage and service request information is recorded in step 510. The "per process" information and the service request information recorded in step 510 are correlated in step 520. An account of resource usage can be presented in step 530 from this correlated information to indicate resources used by each user and for each request.

Computer Hardware

Figure 6:
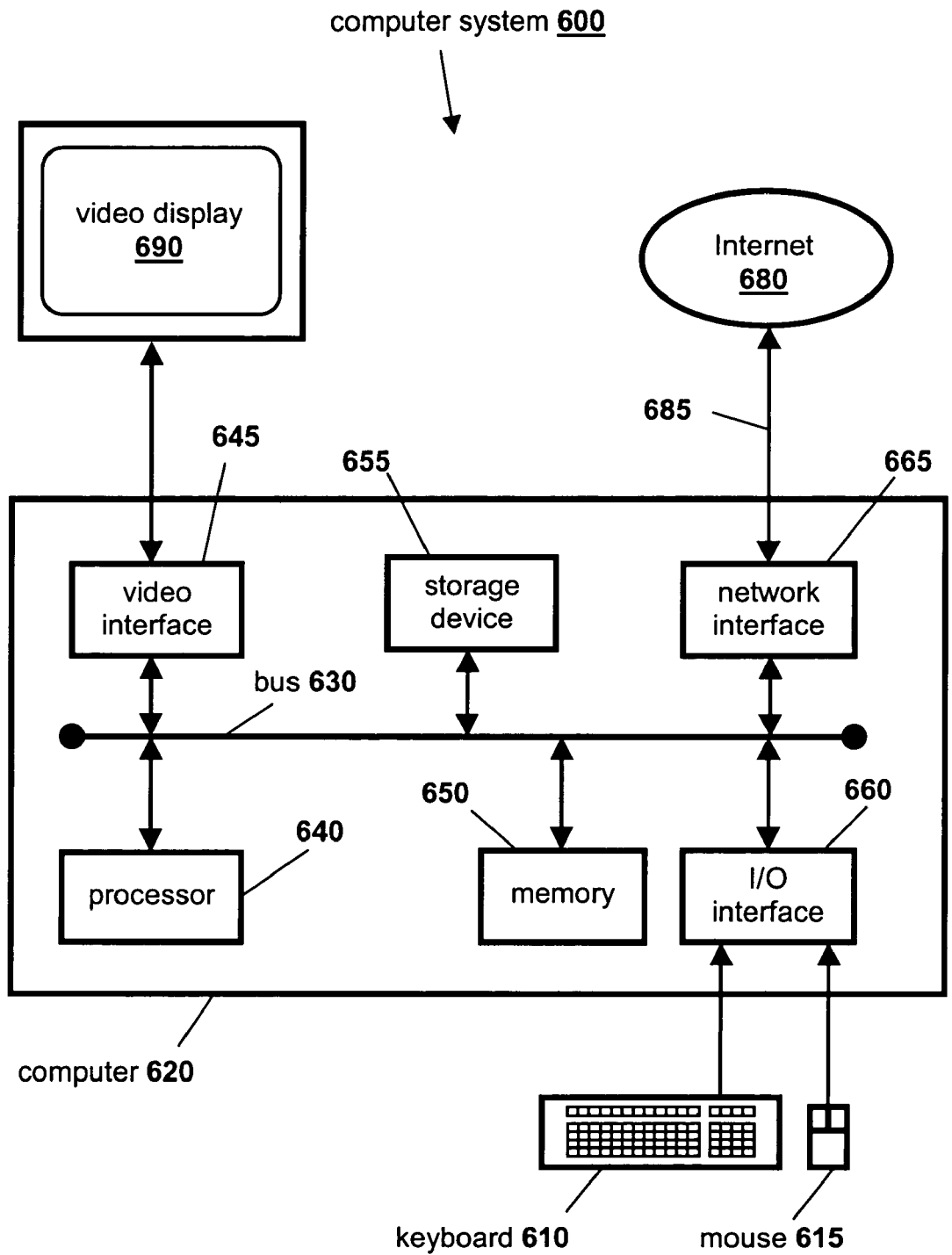
FIG. 6 is a schematic representation of a computer system suitable for performing the techniques described herein.

FIG. 6 is a schematic representation of a computer system 600 of the type that can be used to perform usage metering of networked services as described. Computer software executes under a suitable operating system installed on the computer system 600 to assist in performing the described techniques. This computer software is programmed using any suitable computer programming language.

The components of the computer system 600 include a computer 620, a keyboard 610 and mouse 615, and a video display 690. The computer 620 includes a processor 640, a memory 650, input/output (I/O) interface 660, network interface 665, a video interface 645, and a storage device 655.

The processor 640 is a central processing unit (CPU) that executes the operating system and the computer software executing under the operating system. The memory 650 includes random access memory (RAM) and read-only memory (ROM), and is used under direction of the processor 640.

The video interface 645 is connected to video display 690 and provides video signals for display on the video display 690. User input to operate the computer 620 is provided from the keyboard 610 and mouse 615. The storage device 655 can include a disk drive or any other suitable storage medium.

Each of the components of the computer 620 is connected to an internal bus 630 that includes data, address, and control buses, to allow components of the computer 620 to communicate with each other via the bus 630.

The computer system 600 can be connected to one or more other similar computers via a network interface 665 using a communication channel 685 to a network, represented as the Internet 680.

The computer software may be recorded on a portable storage medium, in which case, the computer software program is accessed by the computer system 600 from the storage device 655. Alternatively, the computer software can be accessed directly from the Internet 680 by the computer 620. In either case, a user can interact with the computer system 600 using the keyboard 610 and mouse 615 to operate the programmed computer software executing on the computer 620.

Other configurations or types of computer systems can be equally well used to implement the described techniques. The computer system 600 described above is described only as an example of a particular type of system suitable for implementing the described techniques.

CONCLUSION

Various alterations and modifications can be made to the techniques and arrangements described herein, as would be apparent to one skilled in the relevant art.

We claim:

1. A method for metering use of network-accessible computer resources by multiple users of said computer resources during a same time period, said method comprising:
   recording, as process accounting information in a memory of a computer system, usage of said computer resources during said time period, said computer resources comprising servers distributed across an infrastructure of a service provider, wherein said usage comprises at least central processing unit (CPU) time, memory usage and input/output (I/O) operations;
   recording, in said memory, service request information for service requests made by said users to said service provider;
   correlating, by a processor of said computer system, the recorded process accounting information and the recorded service request information in order to determine resource usage information for each of said service requests for each of said users during said time period, said correlating comprising:
      identifying overlapping usage of any of said computer resources, said overlapping usage comprising usage, during said time period, of a same computer resource to perform processes for at least two different service requests of at least two different users; and
      allocating any overlapping usage by one of evenly splitting said overlapping usage between said at least two different service requests and splitting said overlapping usage in a weighted manner between said at least two different service requests based upon respective durations of said at least two different service requests; and
   charging said users for said service requests based on said allocating of said overlapping usage.

2. The method according to claim 1, further comprising the step of correlating request logging information and usage logging information.

3. The method according to claim 1, wherein the plurality of processes include processes dynamically spawned by processes for which process accounting information is recorded.

4. The method according to claim 1, further comprising the step of maintaining an active request list of the service requests made by the users.

5. The method according to claim 1, wherein separate active lists are maintained for each of the processes.

6. The method according to claim 1, further comprising the step of calculating a relative weight of each of the service requests.

7. The method according to claim 6, further comprising the step of allocating the resource usage in proportion to calculated relative weights to the service requests.

8. A computer system for metering use of network-accessible computer resources by multiple users of said computer resources during a same time period, said computer resources comprising computer software recorded on a computer-readable medium and said computer system comprising:
   means for recording, as process accounting information, usage of said computer resources during said time period, said computer resources comprising servers distributed across an infrastructure of a service provider, wherein said usage comprises at least central processing unit (CPU) time, memory usage and input/output (I/O) operations;
   means for recording service request information for service requests made by said users to said service provider;
   means for correlating the recorded process accounting information and the recorded service request information in order to determine resource usage information for each of said service requests for each of said users during said time period, said correlating comprising:
      means for identifying overlapping usage of any of said computer resources, said overlapping usage comprising usage, during said time period, of a same computer resource to perform processes for at least two different services requests of at least two different users; and
      means for allocating any overlapping usage by one of evenly splitting said overlapping usage between said at least two different service requests and splitting said overlapping usage in a weighted manner between said at least two different service requests based upon respective durations of said at least two different service requests; and
   means for charging said users for said service requests based on said allocating of said overlapping usage.

9. A computer program product for metering the use of network-accessible computer resources by multiple users of said computer resources during a same time period, said computer resources comprising computer software recorded on a computer-readable medium for performing the steps of:
   recording, as process accounting information, usage of said computer resources during said time period, said computer resources comprising servers distributed across an infrastructure of a service provider, wherein said usage comprises at least central processing unit (CPU) time, memory usage and input/output (I/O) operations;

recording service request information for service requests made by said users to said service provider;

correlating the recorded process accounting information and the recorded service request information in order to determine resource usage information for each of said service requests for each of said users during said time period, said correlating comprising:

identifying overlapping usage of any of said computer resources, said overlapping usage comprising usage, during said time period, of a same computer resource to perform processes for at least two different service requests of at least two different users; and allocating any overlapping usage by one of evenly splitting said overlapping usage between said at least two different service requests and splitting said overlapping usage in a weighted manner between said at least two different service requests based upon respective durations of said at least two different service requests; and charging said users for said service requests based on said allocating of said overlapping usage.

10. The computer program product according to claim 9, said method further comprising the step of correlating request logging information and usage logging information.

11. The computer program product according to claim 9, wherein the plurality of processes include processes dynamically spawned by processes for which process accounting information is recorded.

12. The computer program product according to claim 9, said method further comprising the step of maintaining an active request list of the service requests made by the users.

13. The computer program product according to claim 9, wherein separate active lists are maintained for each of the processes.

14. The computer program product according to claim 9, said method further comprising the step of calculating a relative weight of each of the service requests.

15. The computer program product according to claim 9, said method further comprising the step of allocating the resource usage in proportion to calculated relative weights to the service requests.

* * * * *